United States Patent Office
2,711,644
Patented June 28, 1955

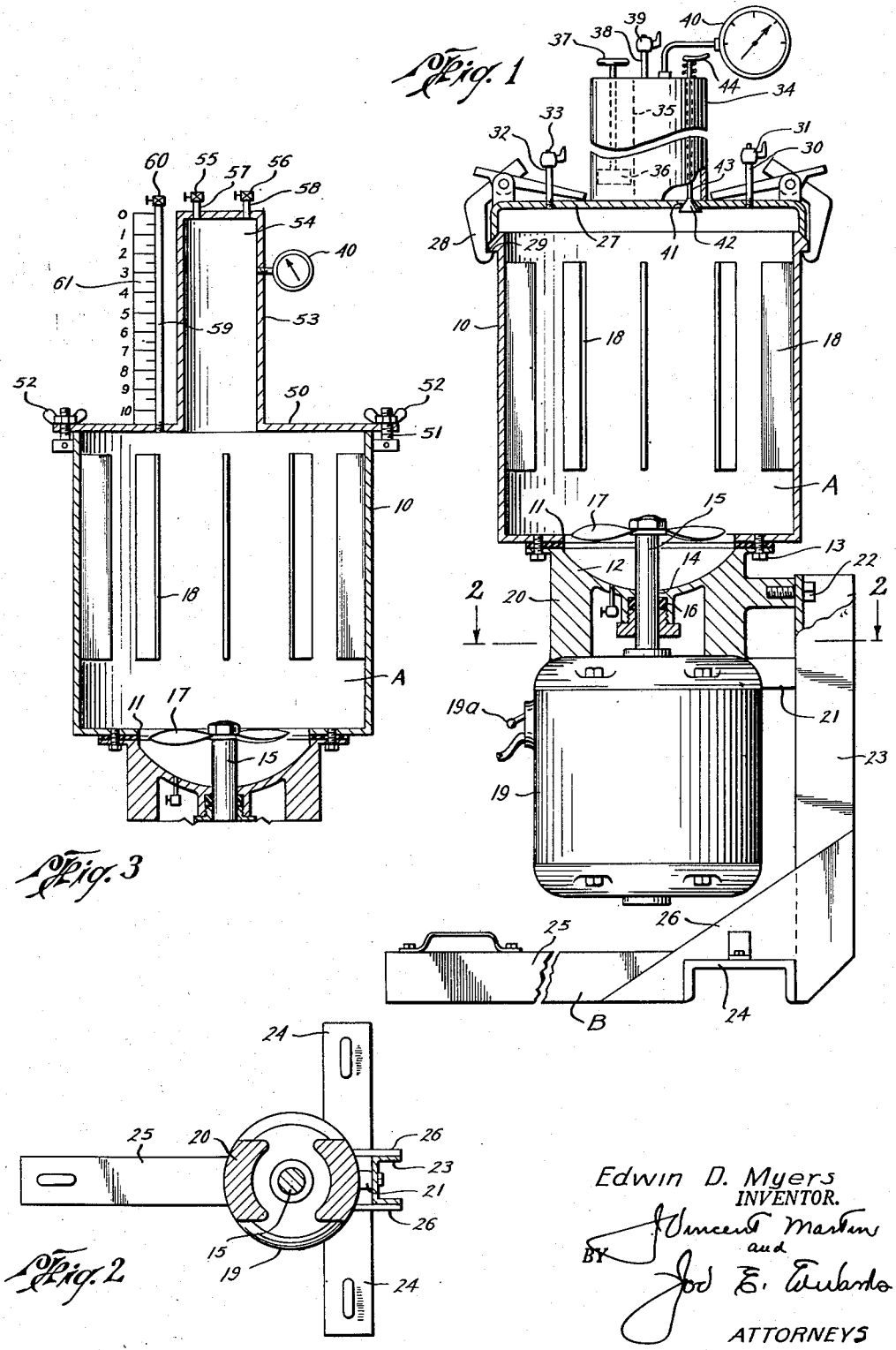

2,711,644

APPARATUS FOR DETERMINING AND MEASURING THE GAS CONTENT OF SOILS

Edwin D. Myers, State College, Miss.

Application May 28, 1951, Serial No. 228,571

1 Claim. (Cl. 73—19)

This invention relates to new and useful improvements in apparatus for determining and measuring the gas content of substances and relates particularly to the determination and measurement of the gas content of soils.

It is well known that the gas content of soil has an important effect on the various properties of the soil, among which are the coefficient of permeability, consolidation of the soil under load which provides information as to the load bearing capacity of the soil, unit weight, and also fluctuations of water tables due to barometric changes. The usual air entrainment meter which is in general use for testing the gas content of concrete or similar substances has been found satisfactory for testing permeable soils and soils which have a moisture content above the liquid limit. However, in the case of the more impermeable soils the pressure normally applied by the usual air entrainment meter does not readily penetrate the soil sample, with the result that an extended period of time, far beyond a time which can be considered practical, would be necessary to determine and measure the gas content of such impermeable soil.

It is therefore one object of this invention to provide an improved apparatus which will quickly and accurately determine and measure the gas content of impermeable soils.

An important object of the invention is to provide an improved apparatus of the character described in which the impermeable soil sample is effectively broken up into its three constituents, soil particles, gas and water, whereby the gas within the sample is released and can be accurately measured and determined in a minimum length of time.

Another object is to provide an apparatus of the character described wherein the soil sample under test is broken up into its constituents within a closed chamber, after which the measurement of the gas content thereof may be carried out either by the application of pressure or by the pulling of a slight vacuum on the chamber; the arrangement being such that the test may be carried out rapidly and in substantially the same time as is required for an ordinary air entrainment test of permeable type soils.

Still another object is to provide an improved method of testing a permeable soil sample to determine its gas content which includes breaking up the sample into its three constituents within a closed chamber, after having introduced water into the closed chamber to increase the moisture content thereof above the liquid limit, and finally applying either a pressure or a vacuum to the closed chamber within which the sample is located to obtain information as to the gas content of said sample.

A further object is to provide an apparatus of the character described, which is exceptionally simple in construction and which has an improved supporting structure for the sample chamber, whereby handling of the sample during test is facilitated.

Still another object is to provide an apparatus which is produced by modifying the usual well known air entrainment meter and which may be employed, not only for determining gas content of substances, but may also be used for determining and measuring specific gravity and water content of said substances.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view partly in section and partly in elevation of an apparatus, constructed in accordance with the invention, for carrying out the improved method, Figure 2 is a horizontal cross-sectional view taken on the line 2—2 of Figure 1, and Figure 3 is a partial vertical sectional view of a modified form of the invention.

In the drawings the numeral 10 indicates a generally cylindrical container having an open upper end and an opening 11 in its bottom. The interior of the container forms a sample receiving chamber A, and the opening 11 in the bottom thereof is closed by a suitable closure 12 which is secured to the container by suitable bolts 13. An axial opening 14 in the closure 12 has a rotatable shaft 15 extending therethrough and a suitable stuffing box 16 seals off about the shaft. An agitator or impeller blade 17 is mounted on the end of the shaft 15 and is disposed within the lower portion of the chamber A formed within the container. As is clearly shown in Figure 1, a plurality of longitudinal baffles 18, which may vary in number, are secured to the inner wall of the container 10 and extend inwardly into the chamber substantially throughout the length of said chamber.

The rotatable shaft 15 which extends outwardly through the closure 12 may be the shaft of an electric motor 19, which motor is mounted below the container. The motor is secured to a pair of diametrically opposed supporting arms 20 which are preferably made integral with and extend downwardly from the closure 12. The supporting arms 20 are suitably secured to one end of the motor and outwardly directed lugs 21 extending outwardly from one of said arms 20 and from the motor are bolted by bolts 22 to an upright channel member 23 of a supporting frame structure B. The channel member 23 has its lower end welded to a pair of base channels 24 and 25, which base channels extend at right angles to each other to form a generally T-shaped base as shown in Figure 2; reinforcing gussets 26 strengthen the connection between the upright channel 23 and the base channels 24 and 25. With this arrangement it will be evident that the supporting structure B has the motor 19 and container 10 secured thereto and functions as a stand to support the apparatus. Because the upright channel 23 is disposed at the point of intersection of the two base channels 24 and 25, it is evident that the apparatus if firmly supported in an upright position and yet the support B may be readily tilted to permit pouring of the contents from the chamber A of the container.

The open upper end of the container 10 is adapted to be closed by a cover 27 and said cover is arranged to be locked in position by pivoted latch members 28 which are mounted on the cover and which engage an external flange 29 on the upper end of the container. The cover is provided with a vent tube 30 normally closed by a pet cock 31 and is also provided with a second vent tube 32 which is normally closed by a pet cock 33.

Disposed axially above the cover and suitably secured thereto is a pressure chamber 34 in which is mounted a pressure pump 35 having a manually operable pump piston 36; the piston has its plunger 37 projecting from the upper end of the chamber and a suitable handle on the end of the plunger facilitates manual operation of the piston. Operation of the pump functions to build up a desired pressure within the chamber 34. A vent tube 38 extends from the upper end of the pressure chamber 34 and is controlled by a pet cock 39, while a pressure gauge 40 is also in communication with the chamber through a suitable connecting line, said gauge providing a visible indication of the pressure within the chamber. Communication between the pressure chamber 34 and the chamber A which receives the soil sample is effected by an opening 41 which is controlled by a manually operable valve 42 having a valve rod 43 extending from the upper end of the chamber with a suitable thumb piece 44 secured to the outer end of the rod. A spring normally holds the valve 42 in a closed position but obviously, manual depression of the thumb piece and valve rod opens the valve to establish communication between the pressure chamber 34 and the sample receiving chamber A.

It is noted that the pressure chamber, together with its associated parts, forms no particular part of the present invention since such chamber forms a part of an air entrainment meter now in general use and manufactured by the Concrete Specialties Co. of Spokane, Washington. This particular pressure chamber has been found suitable for applying pressure to the chamber A, but it is pointed out that other types of pressure applying means could be employed.

In operating the apparatus to carry out the improved method for determining and measuring the gas content of an impermeable soil the particular soil sample is placed within the chamber A formed by the container 10 and the cover 27 is then locked in place to close the open end of the chamber A. With the undisturbed soil sample in place the valve 42 is opened so that a pressure reading is obtained on the gauge 40; this pressure reading will indicate the per cent gas or air which is present in the unfilled portion of the chamber A. Thereafter the valve 42 is again closed and by opening pet cock 33 and utilizing pet cock 31 as a filling element, water which is preferably deaerated is introduced into chamber A to completely fill said chamber after which both pet cocks 31 and 33 are closed. By noting the volume of water which was required to completely fill the chamber and knowing the original volume of the chamber A, the volume of the soil sample in its natural state may be readily determined. After the volume of soil sample is determined, this knowledge together with the initial per cent gas reading, provides information as to the per cent of gas by volume of the entire volume of the chamber A.

After the foregoing calculations are made, the valve 42 is closed and the electric motor 19 is operated by means of a suitable control switch 19a, whereby the impeller or agitator blade 17 is rotated. The speed of rotation of the blade 17 which is in direct contact with the soil sample is such that the sample is disintegrated or broken up, and this breaking up of the sample is assisted by the provision of the inwardly extending baffles 18 within the chamber A. The rotating blade, together with the baffles, functions to break up the sample into its three constituents, soil particles, gas and water, and obviously since the action is carried out within a closed container the relative proportions of the constituents remains undisturbed. It is evident that at the same time that the sample is broken up into its constituents, the soil is thoroughly admixed with the water previously introduced; the water functions to fill all air pockets between the wall of the chamber and the soil and also upon admixture increases the moisture content of the soil above the liquid. Further during operation of the impeller the water is more or less agitated and actuated so that the resultant hydraulic action is a factor in breaking up the soil. After thorough admixture and breaking up of the soil sample has been accomplished, operation of the motor is halted to stop rotation of the blade 17.

Subsequently the pump 35 is manually operated through the plunger 37 to build up an "initial pressure" within chamber 34, such pressure being registered on the pressure gauge 40. The pressure gauge indication may be stabilized by alternately pumping through the hand plunger 37 to increase pressure in chamber 34 or by bleeding pressure from said chamber 34 through the pet cock 39. When the pressure in the chamber has been stabilized, the thumb lever 44 of the valve 42 is depressed and this admits the pressure from chamber 34 into the chamber A within which the soil sample is disposed. In the manner of the operation of the usual air entrainment meter the application of the pressure to the sample will result in a reading on the pressure gauge which indicates the per cent of gas content within the sample. It is, of course, understood that since the per cent gas by volume of the entire volume of the chamber is known by reason of the initial calculations, the pressure reading provides accurate indication of the per cent of gas content of the sample.

In some instances it might be necessary to consider any rising temperature of the mixture which might be due to the energy applied to the mixture within the chamber by actuation of the agitator blade. In such case the change in temperature may be determined and the final reading corrected in accordance therewith. However, it has been found that the rise in temperature of the mixture within the chamber A is so small as to be negligible in the majority of cases.

From the foregoing it will be seen that an apparatus is provided which permits the rapid and accurate testing for gas content of impermeable soils or similar substances. The breaking up of the sample actually places the sample in condition for accurate testing by the usual well known tests. Thus, the standard air entrainment meter may, with the modification illustrated, be employed for accomplishing the improved results. Since the usual air entrainment meter may also be employed to accomplish specific gravity and moisture determinations on permeable substances, the present apparatus has been found satisfactory in determining the specific gravity and moisture content of impermeable soils. The device 40 may be a pressure gauge, as above described, or it may be a combined pressure and vacuum gauge so that it may be employed to control the vacuum in the meter chambers.

In Figure 3 a modified form of the invention is shown wherein vacuum instead of pressure is applied to the chamber A. In this form the container 10 which forms the chamber A is of the construction hereinbefore described and includes the agitator blade 17 in its lower portion. In place of the cover 27 having the pressure chamber 34 secured thereto, a cover 50 closes the upper end of the container 10. The extreme upper end of the container may be modified to carry fastening bolts 51, and by means of these bolts, together with wing nuts 52, the cover 50 may be clamped to the container. An upwardly extending cylinder 53 is preferably made integral with the cover 50 and forms a chamber 54 which is in communication with the chamber A. Suitable pet cocks 55 and 56 control flow through tubes 57 and 58 which communicate with the interior of the chamber 54. The pressure gauge 40 also is connected to the chamber 54.

Extending upwardly from the cover is a liquid level indicator in the form of a glass piezometer tube 59 which has its open upper end closed by a suitable pet cock 60. A calibrated scale 61 is disposed adjacent the tube 59.

In the operation of this form of the apparatus the undisturbed soil sample is placed in the chamber A and the chamber is filled with water, with the volume of the soil sample being determined as hereinbefore described. The cover 50 is placed in position and through one of the pet cocks 55 the interior of both chamber A and chamber 54 is filled with water. The electric motor 19 is then operated to rotate the agitator blade 17 to break up the soil sample and to effect a thorough mixture of the distintegrated soil sample with the water. After thorough admixture and breaking up of the soil sample, the motor 19 is halted in its operation and obviously the gas or air which was present in the soil sample rises to the top and the particular water level within the chamber 53 will be dependent upon the amount of air or gas present. In order to assure that all of the gas or air in the sample has risen to the upper end of the chamber 53, a regulated vacuum is applied to the extreme upper end of the chamber through one of the pet cocks 55 or 56 and thus, any additional air or gas bubbles are brought to the surface to assure that the water level will be in accordance with the amount of gas or air which was present in the sample. It is noted that the regulated vacuum which was applied was not sufficient to withdraw any of the water or soil out of the chamber 53.

Obviously, since the water level in chamber 53 is indicative of the volume of gas or air which was present in the sample the water level which was present in the piezometer tube is indicative of the gas content of the volume. By properly calibrating the scale 61 the percent of gas volume may be directly read from the scale.

It is noted that in both forms of the invention the soil sample is subjected to a breaking up or mixing action which reduces the sample into its basic constituents and functions to release the gas present in the sample. This makes is possible to quickly and accurately measure impermeable substances or gas content.

As used herein, the term "gas" is meant to include any fluid either gas as it is commonly referred to or air. Also, although reference has been made to an ordinary soil sample in order to determine its gas or air content, it is obvious that the test is applicable for determining and measuring gas or air content in any type of substance, such as a core sample taken from a deep sub-surface formation.

Having described the invention, I claim:

An apparatus for quantitatively determining the amount of gas entrapped in an impermeable soil sample including a closed airtight and pressure-tight soil sample receiving chamber, means for admitting water into said container to completely fill the same, a rotatable blade element within said chamber operable from without said chamber, a plurality of longitudinal spaced baffles secured to the inner wall of said chamber and extending inwardly into said chamber substantially throughout the length of said chamber to cooperate with said rotatable blade element to break up said soil sample and disperse the solids therein into a liquid state thereby releasing the gas entrapped in said sample, means for subsequently applying a predetermined pressure to said dispersed sample to compress any entrained air or gas therein, and means communicating with said receiving chamber for indicating a final pressure within said chamber which provides an indication of the percent of gas content of the sample.

References Cited in the file of this patent

UNITED STATES PATENTS

| | | |
|---|---|---|
| 630,309 | Aberg | Aug. 8, 1899 |
| 2,102,105 | Zahm | Dec. 14, 1937 |
| 2,192,525 | Rosaire et al. | Mar. 5, 1940 |
| 2,512,690 | Bliss et al. | July 11, 1950 |
| 2,531,083 | Smith | Nov. 21, 1950 |
| 2,635,459 | Gray | Apr. 21, 1953 |

FOREIGN PATENTS

| | | |
|---|---|---|
| 492,362 | Germany | Feb. 21, 1930 |